Oct. 23, 1934. G. C. MONCKMEIER 1,977,734
LUGGAGE AND TRUNK CARRIER
Filed June 29, 1932 3 Sheets-Sheet 1
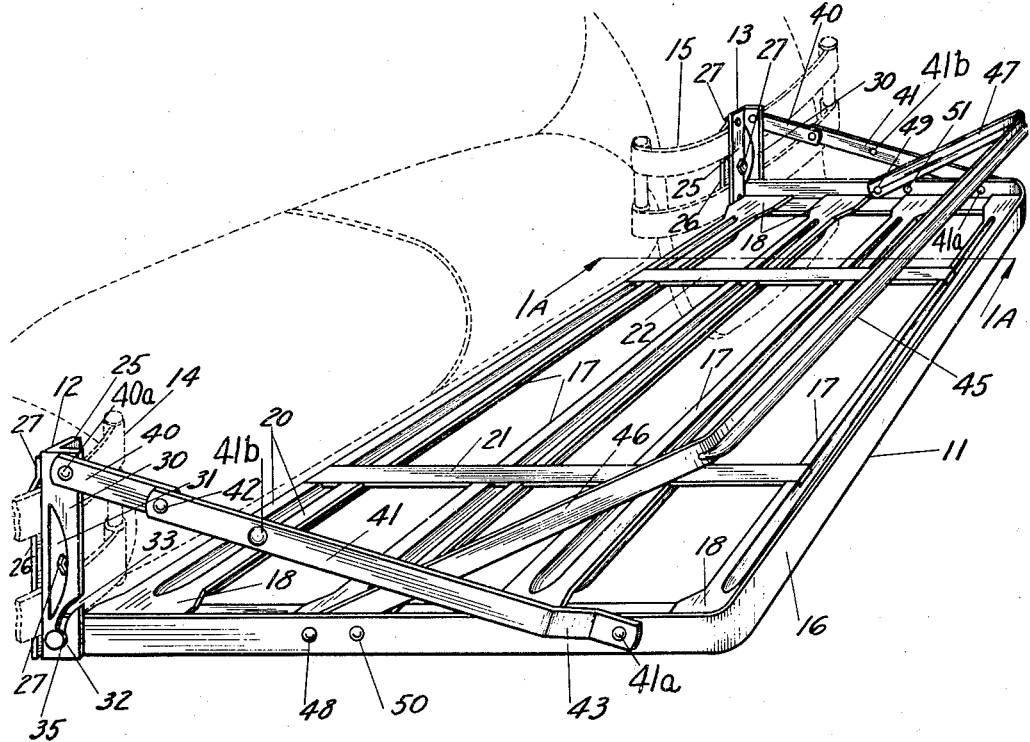
FIG-1
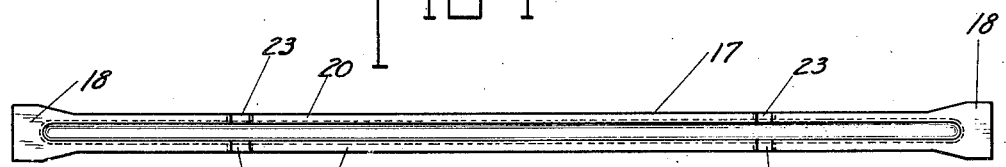
FIG-2
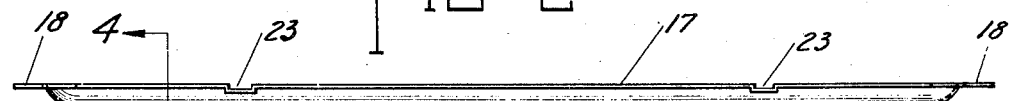
FIG-4 FIG-1A
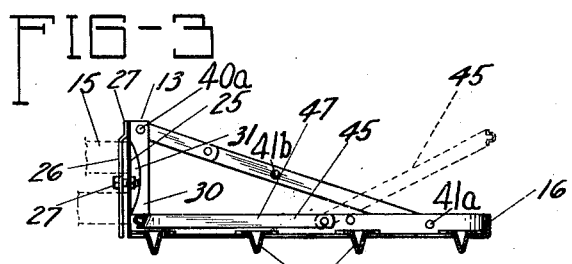
INVENTOR.
Gustav C Monchmeier

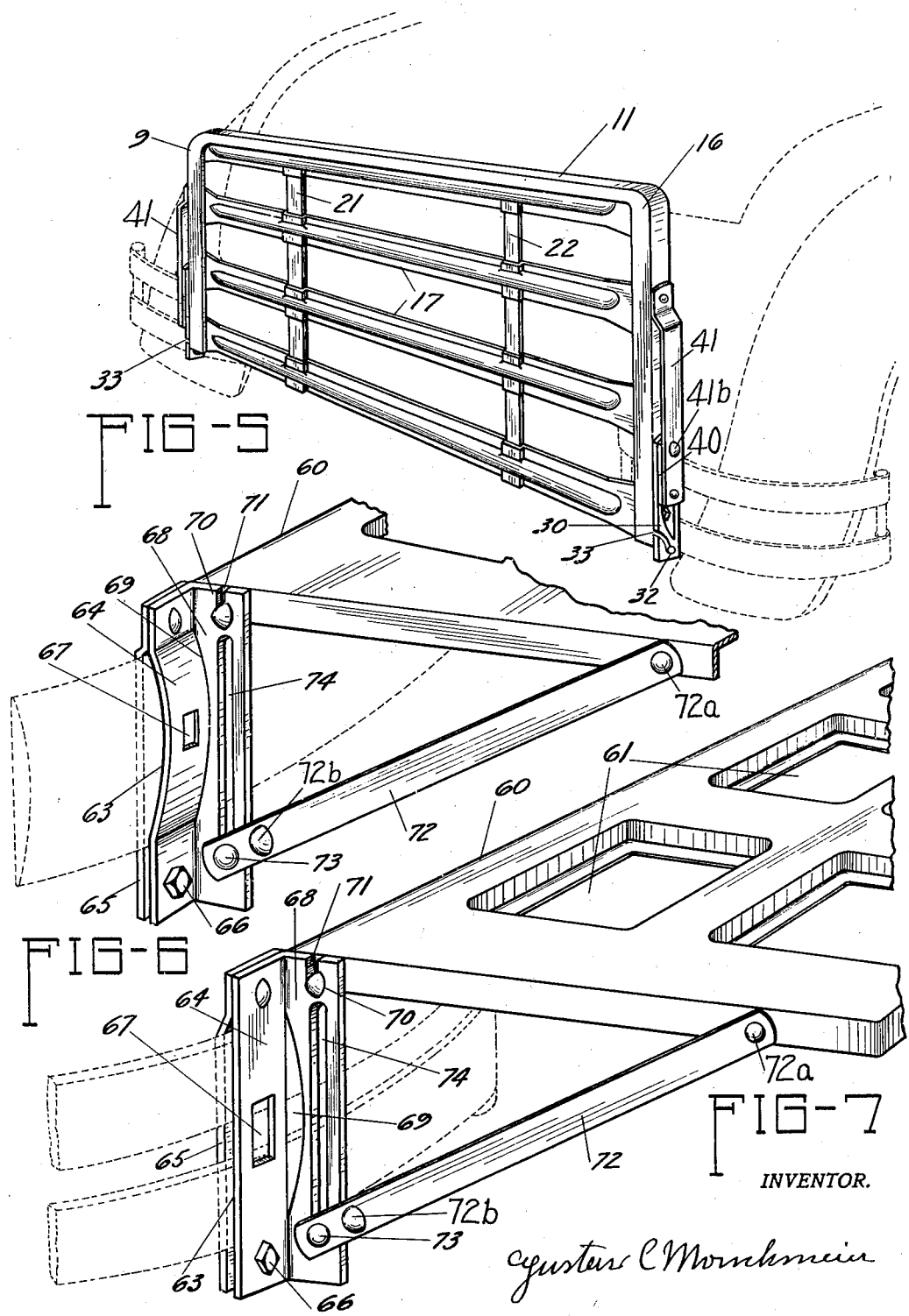

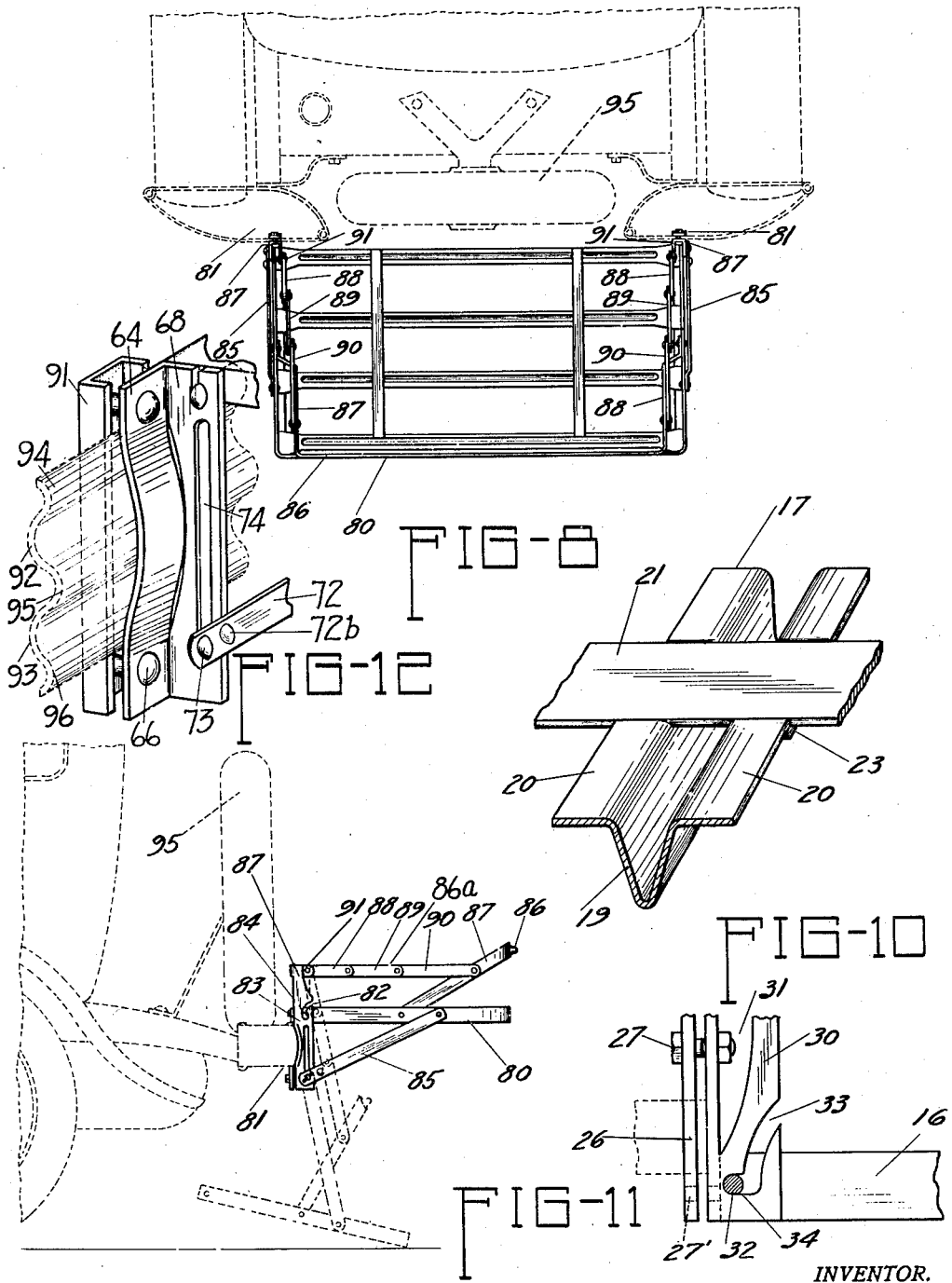

Patented Oct. 23, 1934

1,977,734

UNITED STATES PATENT OFFICE 1,977,734

LUGGAGE AND TRUNK CARRIER

Gustav C. Monckmeier, Davenport, Iowa

Application June 29, 1932, Serial No. 619,904

15 Claims. (Cl. 224—29)

This invention relates to luggage or trunk carriers for automobiles.

The principal object of the invention is to provide a carrier having attaching fittings capable of attachment to parts of the vehicle having various shapes. Fittings having this characteristic are particularly advantageous on a carrier to be mounted on the bumper or bumperette of an automobile inasmuch as the contour of the bumpers or bumperettes of different automobiles vary, some being flat, some round, others arcuate, some comprising a single bar, others two or three bars. I accomplish this object by providing fittings at least one element of which is capable of conforming to the particular shape of the member to which it is clamped. A particular feature of this fitting is that it will conform to such shape by the pressure exerted against it by the act of clamping it to the member. It therefore shapes itself automatically when it is clamped to the supporting member.

Another object of the invention is to provide a carrier having a guard rail which provides the maximum end closure and which may be collapsed down into the frame if desired. When the guard rail is collapsed down into the frame, a substantially flat carrying surface is provided to accommodate a trunk or other article the width of which is greater than the depth of the carrier rack. In the embodiment of the invention disclosed herein the guard is constructed in the form of a U-shaped member having relatively long arms with the ends of the arms pivoted to the sides of the rack at a point near the center of the rack. Stop means are provided which position the guard rail, when it is swung rearwardly, directly over the rear edge of the rack, the length of the arms of the rail member being such that the rail may be swung forwardly down upon the rack. By providing the maximum length of arms which will still permit of swinging the rail into a collapsed position upon the rack, the arms provide the maximum end closure for the rack.

Another object of the invention is to provide a collapsible carrier having novel means for holding the carrier in a collapsed position. I provide a rounded head on certain pivots on the rack fittings, and depressions in the links which hold the rack in its horizontal luggage receiving position, the depressions being so located that the heads of the pivots will be received therein when the rack is swung up into its inoperative position to lock the rack in such position.

Another object of the invention is to provide a carrier which may not only be swung from a horizontal luggage carrying position to a vertical inoperative position, but which also may be readily disconnected from its supporting fittings. This feature is particularly advantageous when the carrier is positioned at the rear of an automobile having a spare tire carrier at the rear, in that it provides greater accessibility to the spare tire for removing or replacing the same. I accomplish this object by providing slots in the fittings for the pivots through which the rack is connected to the fittings. To disconnect the rack it is merely necessary to lift the rack to disengage the pivots from the slot.

Another object of the invention is to provide a carrier rack of improved construction, wherein the maximum strength is provided with the minimum material. The main feature of my improved rack construction resides in the provision of a series of cross members of V-shaped cross section with the edges thereof bent laterally in the plane of the rack, to provide a member having a maximum of strength meanwhile providing a flat carrying surface.

The manner in which these objects and others not specifically mentioned are accomplished is shown and described in the following specification and drawings wherein is illustrated preferred embodiments thereof, although it is to be understood that the invention in its broader aspects may be embodied in structures of other forms.

In the drawings:—

Figure 1 is a perspective view of my improved luggage carrier shown for illustrative purposes as being applied to the bumperettes of an automobile. The carrier is shown in its horizontal luggage receiving position;

Figure 1A is a cross-sectional view along the lines 1A—1A of Figure 1. In this figure, the guard rail is shown in full lines in its retracted inoperative position, and in dotted lines in its operative position;

Figure 2 is a plan view of one of the rib members of the rack;

Figure 3 is a side view of one of the rib members of the rack;

Figure 4 is a cross-sectional view along the line 4—4 of Figure 3;

Figure 5 is a perspective view of the carrier in its vertical inoperative position;

Figure 6 is a fragmentary perspective view of a carrier having a modified form of rack. The carrier is shown as applied to bumpers of the type comprising a single bar, the face of which is ovular;

Figure 7 is a perspective view of the same carrier shown in Figure 6, but applied to a bumper of the type comprising two bars the faces of which are flat.

Figure 8 is a top view of another modification of the carrier;

Figure 9 is an end view of the carrier of Figure 8 showing in dotted lines the position to which the carrier may be lowered to afford greater accessibility to the spare tire.

Figure 10 is a fragmentary perspective view of one of the rib members and one of the cross members of the rack, showing the manner in which the latter is seated in recesses in the former;

Figure 11 is a fragmentary end view of the carrier of Figure 1 showing the connection of the rack with the fitting; and, Figure 12 is a perspective view of a fitting similar to that shown on the carrier of Figures 6 and 7, shown applied to a bumper comprising a single relatively wide bar of sinusoidal cross section.

The carrier shown in Figures 1 to 5 comprises a rack 11, supported on a pair of fittings 12 and 13 clamped to the bumperettes 14 and 15 of an automobile. The rack comprises a U-shaped frame 16 of L-shaped cross-section, one flange extending vertically, when the carrier is in luggage receiving position, and the other flange extending horizontally and inwardly. The sides of frame 16 are connected by means of rib members 17. Members 17 comprise metal stampings the ends 18 thereof being flat and lying upon and fixed to the horizontal flanges of the sides of the frame. Intermediate their ends members 17 are of V-shaped cross-section as shown at 19 with a substantial portion of the sides thereof disposed in a horizontal plane as shown at 20 to provide a flat carrying surface for the rack. The rib members 17 are connected together by two cross members 21 and 22. The cross members 21 are disposed in depressions 23 provided in the horizontal portions 20 of the rib members 17, the depth of the depressions being equal to the thickness of the cross members so that the upper face thereof will be in the same plane with the horizontal portions 20 of the rib members. If desired, the rack 11 may be pressed out of a single piece of sheet metal, members 17 and 21 being in such case formed by punching out the intervening metal.

The fittings 12 and 13 comprise a substantially flat and initially straight clamping member 25 which is adapted to be clamped against the face of the bumper, bumperette, or other member of an automobile or other vehicle. The means for clamping member 25 in position comprises a strap 26, the upper end 27 of which is offset and fixed to the upper end of member 25 to provide space between the strap 26 and member 25 to receive the bumper bars therebetween. Aligned holes are provided in strap 26 and member 25 near the middle thereof to receive a clamping bolt 27. Aligned holes are also provided in the lower ends of strap 26 and member 25 near the lower ends thereof to receive bolt 27 when the carrier is applied to a bumper comprising a single relatively wide bar.

Clamping member 25 is reinforced by means of a rearwardly extending flange 30 which also provides the means by which the rack 11 is connected to the fittings. Flange 30 has an arcuate slot 31 cut therein along the line of intersection of the flange with the clamping member. This renders the middle portion of the clamping member sufficiently yieldable so that it will take the shape of the surface of the bumper or other member to which it is connected when the clamping bolt 27 is drawn up, by the pressure exerted through the clamping bolt. This is an important feature of my invention inasmuch as it makes it possible to connect the carrier to bumpers of different design. This feature is particularly appreciated by the manufacturer, since it obviates the necessity of making a special fitting for each different shape of bumper, the shaping of the fitting to any particular bumper being done by the purchaser in clamping it to the bumper.

Of course, the fittings may be shaped to correspond to a particular bumper in the process of manufacture, if desired. The particular design of my fitting makes this shaping operation a relatively simple one.

Rack 11 is pivotally and detachably connected to flange 30 by means of a pair of laterally extending pivoting lugs 32 provided on opposite sides of the rack at the front end. These lugs rest in curved slots 33 provided in the lower end of flanges 30. The lower ends of the slots are recessed slightly as best shown at 34 in Figure 11, to hold the lugs 32 in position. Heads 35 on lugs 32 prevent the lugs from pulling out of the slots laterally. When so connected with the fittings, the rack may be swung upwardly about lugs 32 from its horizontal luggage receiving position shown in Figure 1 to its vertical inoperative position shown in Fig. 5. The rack, however, may be readily disconnected from the fittings by merely raising its front end to lift the lugs 32 out of the slots 33.

The rack 11 when pivotally connected to the fittings is prevented from swinging beyond a horizontal position by a pair of collapsible connections, one on each side of the carrier, each connection comprising a pair of links 40 and 41 pivotally connected together at 42. Link 40 is pivotally connected to the upper end of flange 30 by means of a pivot 40a, and link 41 is pivotally connected to the side of the frame 16 by a pivot 41a. Link 41 is offset as shown at 43 an amount equal to the thickness of link 40 and flange 30, to permit the links to fold up on the outer side of the flange 30, as shown in Figure 5.

The heads of pivots 40a are rounded to a substantially hemispherical shape as shown. Links 41 have a small depression 41b on the inner side, at a distance from pivot 42 equal to the distance between pivots 42 and 40a. As a result of this arrangement, when the rack is swung up to its vertical inoperative position, as shown in Figure 5, the heads of pivots 40a will be received in the depressions 41b, and thereby lock the carrier in this vertical position.

The carrier is provided with a guard rail 45 of U-shaped formation, the arms 46 and 47 of which are pivoted to the vertical flange of the side members of the frame 16 at points 48 and 49. Points 48 and 49 are so located and arms 46 and 47 are of such length that when the guard rail is swung rearwardly to an angular position of about 30° with respect to the rack, the rail is positioned directly above the rear end of the rack, as shown in dotted lines in Figure 1A, and when swung forwardly it will lie down flat upon the rack adjacent the front end of the rack, as shown in full lines in Fig. 1A. Rail 45 is prevented from being swung beyond this angular position by two stops 50 and 51 provided on opposite sides of frame 16, rearward of points 48 and 49 and positioned to engage arms 46 and 47.

In Figures 6 and 7 is illustrated a modified form of carrier shown attached to a bumper comprising a single bar having an ovular face in Figure 6, and to a bumper comprising two flat bars in Figure 7. The rack 60 of the carrier comprises a single sheet metal stamping having openings 61 cut therein. The edges of the rack are bent downwardly at right angles to the plane of the rack, and the margins of the openings are pressed downwardly and inwardly to increase the rigidity and add to the general appearance of the rack.

The fittings 63 by which the carrier is fixed to the bumper or bumperette of an automobile, or other supporting member, are similar to the fittings 12 and 13 described above. They comprise a clamping member 64 which is clamped to the face of the bumper by means of a strap 65 fixed to the upper end of member 64, and a clamping bolt 66 which may be inserted in aligned holes 67 near the middle of strap 65 and member 64, or similar aligned holes near the end of the strap and member, depending on the kind of bumper to which the carrier is fastened. While it is usually desirable to use the center holes when the carrier is applied to a double bar bumper, since by drawing up the bolt in such position, the center portion of the clamping member can be drawn into the space between the bars, on bumpers wherein the bars are relatively close together, I find it desirable to use the end holes on double bar bumpers also. Such is shown in Figure 7.

Fitting 64 is provided with a flange 68 similar to flange 30 described above, except that it connects with the inner edge of the clamping member instead of the outer edge thereof. Flange 68 has a similar arcuate slot 69 along the line of intersection of the flange 68 with the clamping member 64, for the purpose of rendering the middle portion of the clamping member yieldable so that it will take the shape of the surface to which it is clamped. In Figure 6, the clamping member 64 is shown bent to the shape of the ovular faced single bar bumper to which it is fixed, the outer face of the clamping member being substantially in contact with the curved edge of the slot 69.

Rack 60 is pivotally and detachably connected to flange 68 by means of a pair of lugs 70 similar to lugs 32. Lugs 70 rest in slots 71 in flange 68, which in this case are provided in the upper end of the flange. Slots 71 are shaped similar to slots 33, except that the recess in the bottom of the slot in this case extends rearwardly. Rack 60 is held in a horizontal position by means of a single link 72 on each side of the rack. Link 72 is pivoted to the side of the rack near the rear end at one end by means of a pivot 72a, and has a pin 73 fixed to the other end which slidingly engages in a vertical slot 74 in flange 68. When the carrier is in its horizontal luggage receiving position, pin 73 rests in the lower end of the slot 74. When the rack 60 is pivoted upwardly into a vertical inoperative position, links 72 are drawn upwardly and pins 73 slide upwardly in slots 74. The heads of lugs 70 are rounded to a substantially hemispherical shape as shown, and links 72 have small depressions 72b on the inner side at a distance from pivot 72a equal to the distance between pivot 72a and lug 70. As a result of this arrangement, when the rack is swung up to its vertical inoperative position, the heads of lugs 70 will be received in the depressions 72b and thereby lock the carrier in a vertical position.

In Figures 8 and 9, I have illustrated another form of carrier embodying the features of my invention. The rack 80 is of the same construction as the rack 11 described above. The fittings 81 are similar to the fittings 63, being provided with a slot 82 in the flange 83 similar to slot 71, in which lugs 84 similar to lugs 70 are disposed. Rack 80 is held in a horizontal luggage receiving position by means of a pair of links 85 which are connected to the rack and fittings similar to links 72.

A guard rail 86 similar to rail 45, previously described, is provided, the ends of the arms 87 and 88 thereof being pivoted to the sides of the rack 80. In this carrier rail 86 is held in its operative position above the rear end of the rack through collapsible connections 86a connected with an upwardly extending extension 87 on the flanges 83 of the fittings. These connections 86a comprise three links 88, 89 and 90 pivotally connected end to end in the order named. Link 88 is pivotally connected to a lug 91 extending rearwardly from the upper end of the extension 87 of the flange 83. When the carrier is swung upwardly to an inoperative position, rail 86 is swung down upon the rear edge of the rack, connections 86a folding together.

Rack 80 may also be readily disconnected from the fittings 81 by raising the front end thereof to lift the lugs 84 free of the slots 82, and then dropping the rack to the position shown in dotted lines in Figure 9, to give greater accessibility to the spare tire, indicated at 95.

The fitting shown in Fig. 12 is the same as the one shown in Figures 6 and 7, except that member 91, corresponding in function to member 65, is made of a piece of channel. The other parts thereof are identical and have been identified by the same reference numerals. The manner in which the clamping member 64 shapes itself to provide a maximum bearing surface upon the face of the bumper is to be particularly noted in this figure. There are at least five areas of contact. Member 91 bears against the rear side of the bumper along ridges 92 and 93, and the clamping member 64 bears against the front face of the bumper upon ridges 94, 95 and 96.

What I claim as my invention and desire to have protected by Letters Patent is:

1. A supporting fitting for connecting a luggage carrier to an automobile bumper or other irregularly shaped member comprising a clamping member adapted to be clamped to the face of the bumper or member, said clamping member provided with a reinforcing flange extending at an angle to said member and connected therewith at its two ends and being spaced therefrom intermediate its ends to permit the intermediate portion of said member to conform to the contour of the face of the bumper or member.

2. A luggage carrier comprising a rack and a fitting for clamping the carrier to the bumper of an automobile, said fitting comprising a clamping member adapted to contact the face of the bumper, said member having a flange extending rearwardly therefrom to which the rack is connected, said flange having a slot cut therein along the line of intersection with the clamping member to permit the middle portion of the clamping member to take the shape of the surface to which it is clamped.

3. A luggage carrier comprising a rack, a guard rail of substantially U-shaped formation, the length of the arms thereof being slightly greater than half the length of the rack, the ends of the arms thereof being pivoted to the sides of the rack at points spaced from one end of the rack a distance equal to the length of the arms to permit the rail to be manually swung in a direction towards said end against the top of the rack, and means for limiting the swinging of said rail in the other direction to a position where the portion of the rail between the arms will be directly above the other end of the rack and the arms of the rail will form end enclosures for the rack.

4. A luggage carrier comprising a rack, a pair of fittings by which the carrier is fastened to a vehicle, a pair of pivoting lugs on opposite sides of the rack adjacent the front end, a substantially vertically disposed slot open at its upper end in each of said fittings for receiving said lugs to establish a detachable pivotal connection of the rack with the fittings, means including a pair of links connected between said rack and points on said fittings spaced vertically from said slots for limiting swinging movement of said rack on said pivoting lugs from a vertical inoperative position to a horizontal luggage receiving position when said lugs are in said slots, but permitting said rack to be moved to a lower position when said lugs are removed from said slots.

5. A luggage carrier comprising a rack, a pair of fittings for the rack by which the carrier may be fixed to the rear bumper or bumperettes of an automobile, said rack at its front corners being connected to said fittings, a guard rail of substantially U-shaped formation, the ends of the arms thereof being pivoted to the sides of the rack near the middle thereof, means for holding the rail, when swung to its operating position, so that the portion of the rail between its arms is disposed directly above the rear edge of the rack with the arms of the rail positioned at an angle to the rack, and a connection from each fitting at a point thereon spaced above the point of connection of the front corner of the rack with the fitting to the adjacent side of the rack near the rear end thereof to hold the rack in luggage receiving position, said connections crossing the arms of the rail and with said arms forming end enclosures for the rack.

6. A luggage carrier comprising a pair of fittings by which the carrier may be fixed to the rear of an automobile, each fitting having a rearwardly extending flange having a slot formed therein near the lower end thereof, said slot opening in the rear edge of the flange and extending downwardly with a recess at the bottom thereof extending forwardly, a rack having a lug extending laterally on each side thereof near the forward end, said lugs being insertable into said slots and being adapted to rest in said recesses, and a collapsible connection from the upper ends of each fitting to the adjacent side of the rack to limit the swing of said rack about said pivots when positioned in said recesses to a horizontal luggage receiving position, but permitting the rack to be lowered to a position below said fittings when said pivots are removed from said slots.

7. A luggage carrier comprising a pair of fittings by which the carrier may be fixed to a vehicle, each fitting having a flange extending longitudinally therefrom having a substantially vertically disposed slot open at the top formed therein, a rack having a laterally extending lug on each side near one end, said lugs being adapted to be inserted into said slots, and a pair of links pivotally connected to said flanges at points spaced vertically from said slots and to the respective sides of the rack to retain said rack in a horizontal luggage receiving position.

8. A luggage carrier comprising a pair of fittings by which the carrier may be fixed to a vehicle, each fitting having a flange extending longitudinally therefrom having an open slot formed therein, a rack having a laterally extending lug on each side near one end, said lugs being adapted to be inserted into said slots, and a pair of links pivotally connected to said flanges at points spaced vertically from said slots and to the respective sides of the rack to retain said rack in a horizontal luggage receiving position, said slots having recesses in the bottom thereof extending longitudinally in the direction said rack tends to move relative to the points of connection of the links with the fittings, said recesses forming pockets for said lugs to prevent the latter from being accidentally forced out of said slots due to the movement of the vehicle.

9. A luggage carrier comprising a pair of fittings by which the carrier may be fixed to a vehicle, each fitting having a flange extending longitudinally therefrom having a substantially vertically disposed slot open at the top formed therein, a rack having a laterally extending lug on each side near one end, said lugs being adapted to be inserted into said slots, and a pair of links pivotally connected to said flanges at points spaced vertically from said slots and to the respective sides of the rack to retain said rack in a horizontal luggage receiving position, and heads on said lugs to prevent them from sliding out of said slots due to an accidental spread of the members of the vehicle to which said fittings are fixed.

10. A luggage carrier comprising a pair of fittings for fastening the carrier to a support, a rack pivotally connected at opposite sides to said fittings, collapsible connections between said fittings and said rack for holding the rack in a horizontal luggage receiving position, said connections each comprising two links, one link being pivoted at one end to the fitting at a point above the point of connection of said rack with the fitting by a first pivot and at the other end to the other link by a second pivot, said first pivot having a rounded head, and said other link having a depression spaced from said second pivot a distance equal to the distance between said pivots, whereby the head of said first pivot will be received in said depression when said rack is swung into an inoperative position to hold the rack in such position.

11. A supporting fitting for connecting a luggage carrier to an automobile bumper or other irregularly shaped member comprising a clamping member adapted to be clamped to the face of the bumper or member, said clamping member being provided with a reinforcing flange extending at an angle to said member, said flange having an arcuate slot therein adjacent the line of intersection with the clamping member, the middle portion of said clamping member being bent into said slot.

12. A luggage carrier comprising a pair of fittings by which the carrier is fastened to a vehicle, a rack, means pivotally and detachably connecting said rack at its front corners to said fittings, and connections extending from said rack adjacent its rear corners to said fittings holding said rack in a horizontal luggage carrying position when the rack is connected to the latter, said connections being collapsible whereby said rack may be swung from its horizontal position to a vertical inoperative position when the rack is connected to said fittings, and may be lowered beyond said horizontal position when it is disconnected from said fittings.

13. A luggage carrier rack having a plurality of ribs, each comprising a flat member having a longitudinal central portion depressed to form a V-shape in cross-section, the sides thereof providing a flat carrying surface for the rack.

14. A luggage carrier rack having a plurality of ribs, each comprising a flat member having a longitudinal central portion depressed to form a V-shape in cross-section, the sides thereof providing a flat carrying surface for the rack, and cross members connecting said ribs, said cross members lying in depressions provided in the side portions of the ribs to dispose the upper face thereof in the plane of the carrying surface.

15. A luggage carrier rack having a plurality of ribs, each comprising a flat member having a longitudinal central portion depressed to form a V-shape in cross-section, the sides thereof providing a flat carrying surface for the rack, and cross members connecting said ribs for reinforcing the latter against lateral bending.

GUSTAV C. MONCKMEIER.